United States Patent [19]

Moore et al.

[11] Patent Number: 5,528,503
[45] Date of Patent: Jun. 18, 1996

[54] INTEGRATED AUTOMATION DEVELOPMENT SYSTEM AND METHOD

[75] Inventors: Stephen F. Moore, Lewisville; Thomas E. Byrd, Allan, both of Tex.

[73] Assignee: Texas Instruments Incoporated, Dallas, Tex.

[21] Appl. No.: 56,007

[22] Filed: Apr. 30, 1993

[51] Int. Cl.⁶ .................................................. G06F 19/00
[52] U.S. Cl. ............................................ 364/468; 364/131
[58] Field of Search ............................. 364/468, 474.11, 364/131–139; 395/725, 575, 650, 200, 155

[56] References Cited

U.S. PATENT DOCUMENTS

| | | | |
|---|---|---|---|
| 4,698,766 | 10/1987 | Entwistle et al. | 364/468 |
| 5,153,839 | 10/1992 | Cross | 364/468 |
| 5,167,035 | 11/1992 | Mann et al. | 395/575 |
| 5,212,645 | 5/1993 | Wildes et al. | 364/468 |
| 5,212,792 | 5/1993 | Gerety et al. | 395/650 |
| 5,231,585 | 7/1993 | Kobayashi et al. | 364/468 |
| 5,255,197 | 10/1993 | Iida | 364/468 |
| 5,257,384 | 10/1993 | Farrand et al. | 395/725 |
| 5,276,863 | 1/1994 | Heider | 395/575 |
| 5,299,197 | 3/1994 | Schalfly | 395/155 |
| 5,329,619 | 7/1994 | Pagè et al. | 395/200 |

FOREIGN PATENT DOCUMENTS 0162670  5/1985  United Kingdom .......... G05B 19/417

OTHER PUBLICATIONS

'Monolithische Programmierung—ein Verfahren zur Programmierung verteilter heterogener Automatisierungssyteme' AT Automatisierungstechnik, vol. 39, No. 10, Oct. 1991, Müchen, de p. 344–353, XP000265596 Heinrich Weber. p. 350 right column, last paragraph—p. 352, left column, paragraph 3*.

'Semiconductor CIM Standard Solution' Proceedings of the Industrial Computing Conference, vol. 2, 23 Oct. 1992, Houston, Texas, USA pp. 367–374, XP000344870.

*Primary Examiner*—James P. Trammell
*Attorney, Agent, or Firm*—W. Daniel Swayze, Jr.; W. James Brady, III; Richard L. Donaldson

[57] ABSTRACT

An integrated automation development system (10) for controlling and coordinating manufacturing equipment (24) employs a plurality of server processes (14, 16, 22, 28, 34, 36). Each server process includes a messaging manager (45) for receiving ASCII messages, and an interpreter (43) for evaluating the received ASCII messages and identifying commands within the messages. The server process further includes a command manager (41) for receiving and executing the commands, and a logic controller (47) for managing the logic flow of the command execution by the command manager (41). The servers may include additional commands (48) that enable them to serve as queue servers (34), terminal servers (28), and other application-specific server processes.

19 Claims, 7 Drawing Sheets

FIG. 14

INTEGRATED AUTOMATION DEVELOPMENT SYSTEM AND METHOD

TECHNICAL FIELD OF THE INVENTION

This invention relates in general to the field of automation systems. More particularly, the present invention relates to an integrated automation development system and method.

BACKGROUND OF THE INVENTION

The task of automation characteristically requires the coordinated control of numerous entities to reach a common goal. This task is complex because of the nature of the automation environment and requirements. The automation entities may be real, such as factory equipment, local area networks, databases and user terminals, or abstract, such as data, control software, and communication messages and protocols.

A first difficulty in automation integration is communication. Typically, the automation entities cannot communicate directly with one another and require interfaces for inter-entity communications. However, it is apparent that the solution is not to formulate interface $\alpha$ for communications between entities X and Y, interface $\beta$ for communications between entities Y and Z, and interface $\gamma$ for communications between entities Z and X, and so on. Such a system would require duplicitous efforts for initial system configuration and subsequent reconfigurations.

The task of automation integration must also facilitate frequent system reconfigurations and modifications. Equipment are often added or omitted from a processing line or cell, the automated processing lines or cells may be frequently reconfigured, etc. Therefore, the automation system must easily accommodate these changes.

Also typical of automation systems is that the tasks performed by many of the entities are done in parallel. Therefore, the automation system must also accommodate parallel executions to satisfy this requirement.

SUMMARY OF THE INVENTION

In accordance with the present invention, an integrated automation development system and method are provided which substantially eliminate or reduce disadvantages and problems associated with prior arrangements.

In one aspect of the present invention, an integrated automation development system for controlling and coordinating manufacturing equipment employs a plurality of server processes. Each server process includes a messaging manager for receiving ASCII messages, and an interpreter for evaluating the received ASCII messages and identifying commands within the messages. The server process further includes a command manager for receiving and executing the commands, and a logic controller for managing the logic flow of the command execution by the command manager. The servers may include additional application-specific commands that enable them to serve as queue servers, terminal servers, and other application-specific server processes.

In another aspect of the present invention, a method for integrating an automation development system for controlling and coordinating manufacturing equipment is provided. The method comprises the steps of checking for and receiving ASCII messages from other server and client processes, evaluating received ASCII messages including at least one command expressed in a text-based programming language, and recognizing the commands in the ASCII messages. The commands are executed and the server process returns to checking for ASCII messages.

In yet another aspect of the present invention, an integrated automation development system includes a control client for generating messages containing commands. An equipment server serving as an interface to a manufacturing equipment receives the messages from the control client process, controls the manufacturing equipment as directed by the commands in the messages, and generates messages in response thereto. A queue server is further provided for enabling the routing of the messages between the control client and the equipment server.

BRIEF DESCRIPTION OF THE DRAWINGS

For a better understanding of the present invention, reference may be made to the accompanying drawings, in which.

DETAILED DESCRIPTION OF THE INVENTION

Figure 1:
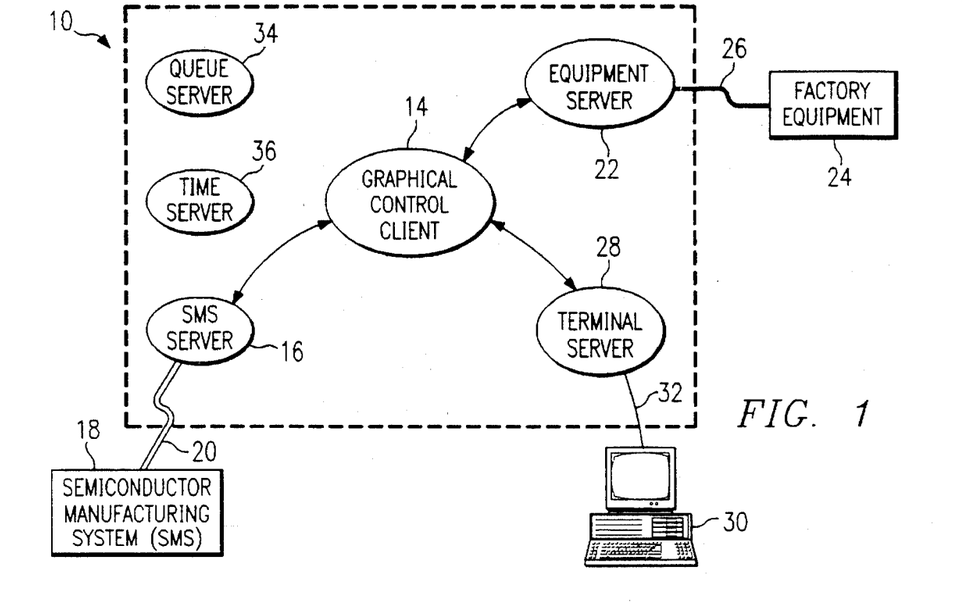
FIG. 1 is a simplified top level system block diagram of an embodiment of the invention.

With reference to the drawings, FIG. 1 illustrates an embodiment of the integrated automation development system and method, indicated generally at 10 and constructed according to the teaching of the present invention. As shown, the integrated automation development system 10 is generally based on a client-server model that defines system modularity and the method of communication between modules. The system 10 is comprised of a group of cooperating tasks called clients and servers. In FIG. 1, a graphical control client 14 cooperates and functions with a SMS (semiconductor manufacturing system) server 16, an equipment server 22, and a terminal server 28. Furthermore, additional servers—queue server 34 and time server 36 performs tasks needed for the overall functions of the system.

A server generally manages and controls a real or abstract object or entity in the system. It presents a high-level messaging interface to its clients by responding to command requests. For example, equipment server 22 provides interfaces to a factory equipment 24, SMS server 16 provides interfaces to a factory host system (the semiconductor manufacturing system 20), and terminal server 28 provides interfaces operator terminals 30, and to application software running on the terminal 30.

On the other hand, the graphical control client 14 is a task within the system 10 that sends command requests to the servers 16, 22, and 28 in order to access the functionality of the servers' underlying object or entity. Automation is therefore accomplished by coordinating and controlling a group of objects through their servers. The control object is itself an abstract entity which is implemented as a client process.

In general, servers do not have prior knowledge of other servers which represent high level objects in the system. For example, the equipment server 22 should not send commands to a factory host server 16 because this would build unnecessary dependencies in the equipment server 22 on the particular factory host 16 and its command syntax. Such integration activities should be handled by a control client, for example, the graphical control client 14.

Figure 2:
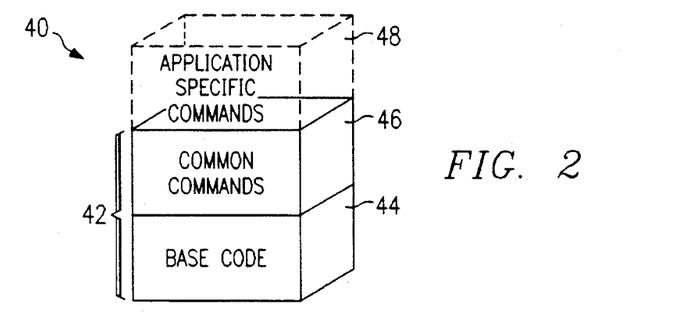
FIG. 2 is a diagram illustrating the components of an embodiment of a server shell module.

Referring to FIG. 2, the servers 16, 22, 28, 34 and 36 and client 14 can be represented by a general structure called a server 40. Each server 40 is created by adding application-specific code and commands 48 to pre-existing software modules called server shells 42. These server shells 42 are executable files that are configured with text files upon start-up to create unique application servers and clients. The server shells 42 are preferably configured to be application programs by loading commands expressed in an interpreted text-based programming language or also called a script shell-like language at runtime or by linking C++ commands at compile-time. Preferably, the server shells 42 include two basic building blocks: base code 44 and common commands 46. Therefore, when a new application server is needed, its implementation begins with the server shell 42 upon which application-specific code are be built.

Figure 3:
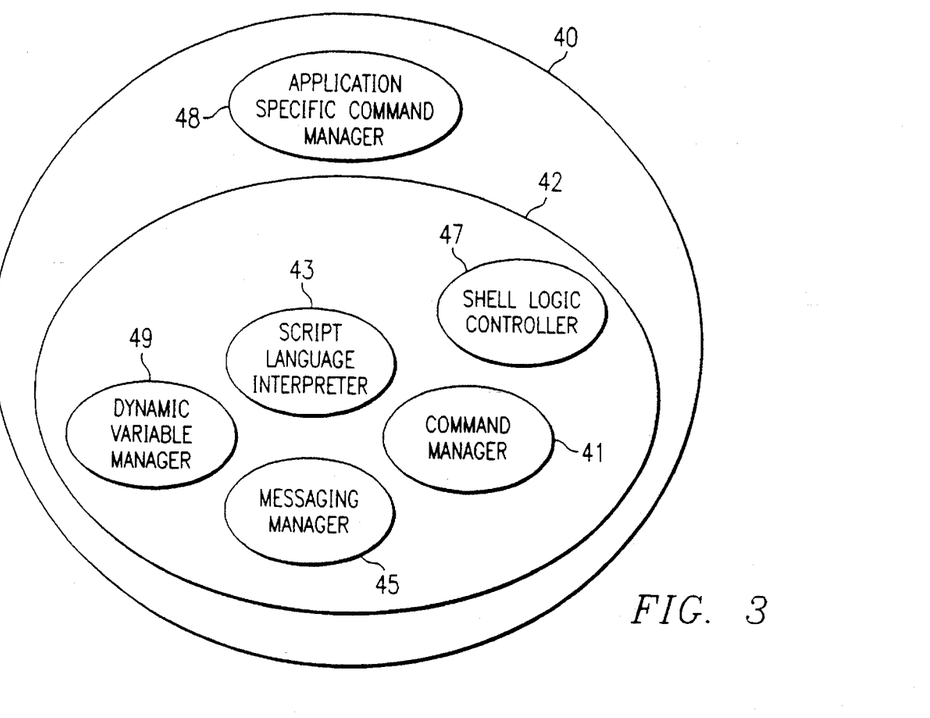
FIG. 3 is a simplified diagram of the main server components.

Referring to FIG. 3, the server process 40 is shown with its various main functional components. The server 40 includes the server shell 42 and the added application specific commands and code manager 48. The server shell 42 itself includes many functional modules which perform basic tasks. The server shell 42 includes a command manager or a common command module 41 which functions as a process-level operating system for commands. The command manager 41 manages and control the execution of command requests and provide facilities for data storage and event logging. The server shells 42 are only foundations for building actual application servers or clients, such as the equipment server 22, the terminal server 28, and queue server 34. The server shells 42 contain commands that facilitate the development of special applications. This organization contributes to the modularity and reconfigurability of the automation development system 10.

The server shell 42 also includes a script or shell-like language interpreter 43, allowing new commands to be created at runtime in the script language. The script language may be a generic high-level shell-like code generally understood by those familiar with the UNIX operating system environment. The script language may include conditionals, looping constructs, expression evaluation, and environment variables. The use of the script language rather than the C++ language, for example, eliminates the need to recompile and relink the code prior to execution since the script language is interpreted line-by-line. During interpretation, the script language interpreter 43 essentially takes the entries in script language and translates them in to dynamic variable structures that are understandable and accessible by the servers.

The server shell 42 further includes a messaging manager 45. The messaging manager 45 performs message communications-related tasks such as message syntax validation and routing. The server shell 42 also provides a shell logic controller 47 for managing the basic control and logic flow of the server 40. An additional dynamic variable manager 49 serves to oversee the storage and access of the dynamic variable structure shown in FIG. 4. The functions of the messaging manager 45, the shell server logic controller 47 and the dynamic variable manager are discussed in more detail below.

The added application-specific commands 48 perform actions on or change the state of the server or the object it serves. Servers started from the same shell executable can also share runtime text segments or code, thus reducing runtime memory usage. For example, eight operator interfaces that are created by loading configuration files into the same terminal server shell executable use only one copy of the actual terminal server shell code at runtime. Each process can maintain a separate data area in memory, but uses the same block of executable code in memory.

Figure 4:
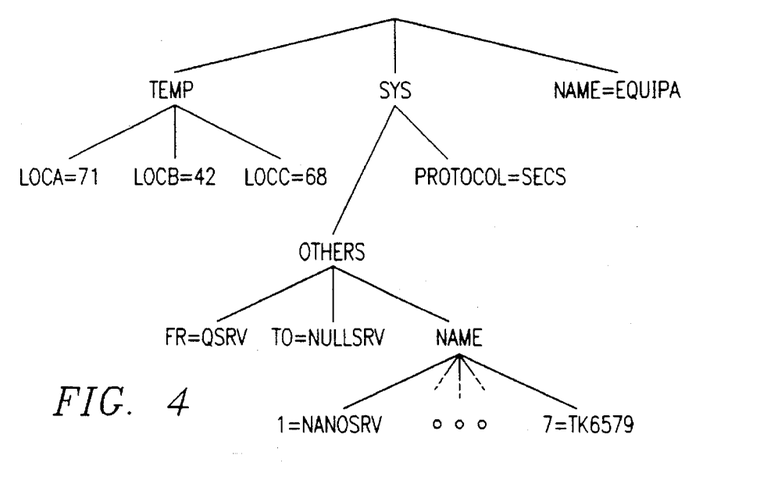
FIG. 4 is a simplified diagram illustrating the data structure of the dynamic variables.

Referring to FIG. 4, an exemplary dynamic variable data structure is shown. In the server 40, commands share data through this internal hierarchy of dynamic symbolic text variables. By convention, the state of the server 40 is defined in these variables. Programming in the integrated automation development system 10 thus consists mainly of manipulating the dynamic variables and sending messages. The complexity of an algorithm often depends on the structure of its underlying data. The dynamic variables 49 encourage the developer to build data representations for which there are clear algorithms. The following is an example of dynamic variables expressed in the script language:

```
{
    { temp
        loca=71
        locb=42
        locc=68
    }
    { sys
        { others
            fr=qsrv
            to=nullsrv
            { name
                1=nanosrv
                2=thermsrv
                3=timer
                4=smsgate
                5=smssrv
                6=nullsrv
                7=tk6579
            }
        }
        protocol=secs
    }
    name=equipa
}
```

Figure 5:
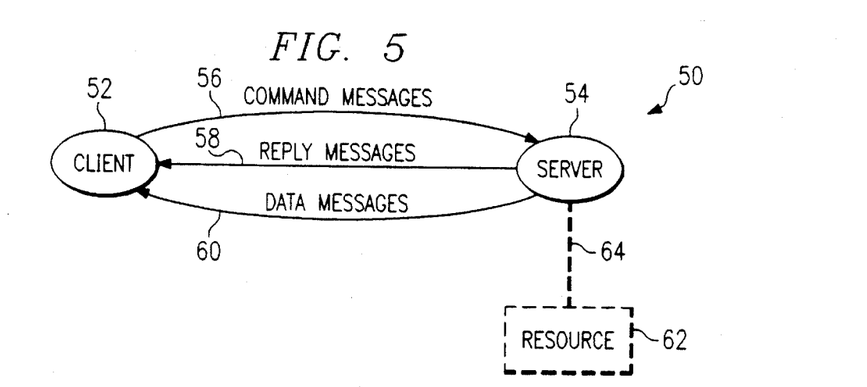
FIG. 5 is a simplified diagram illustrating the message-based communications protocol.

The above example is graphically represented in FIG. 4. For example, the dynamic variable structure 49 shows that the name of the server is "EQUIPA" and that it has monitored and recorded some temperature or "TEMP" measurements of three locations (LOCA, LOCB, and LOCC). The state of the dynamic variables 49 also tells us that this equipment server may process messages in the SECS (SEMI Equipment Communications Standard) format by the value of its "SYS>PROTOCOL" dynamic variable. Therefore, it may be seen that the dynamic variables 49 provides an orderly and hierarchical organization of data or values for each server process 40 that is easily accessible. Referring to FIG. 5, the communications scheme between clients and servers is shown. The client 52 wants a resource 62 to do a specific task. The client 52 communicates this desire by sending a command request message 56 to server 54, who responds with a reply and an optional data message 58 or 60. All messages are composed in readable ASCII strings. The data messages 60 are defined as those messages that are neither commands nor replies. The data messages are used to send data to a client 52 after the reply 58 to the command message 56 has been sent. The server 54 thus represents an interface to the resource or object 62. This command-driven exchange governs all actions within the automation development system 10. Therefore, actions take place in or by the resource 62 as the result of incoming messages. All incoming messages are first stored in a message queue. The messages are read from the queue on a FIFO (first-in-first-out) basis. The management of the message queues in the system 10 is performed by the queue server 34, details of which are described below.

Figure 6:
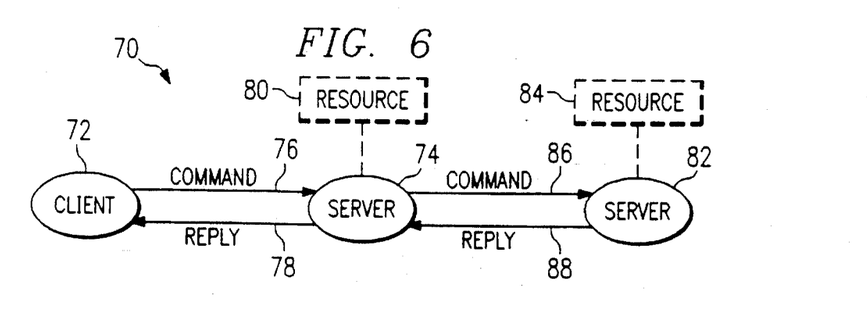
FIG. 6 is another simplified diagram illustrating the message-based communications protocol.

Referring to FIG. 6, an alternative communication scheme 70 is illustrated. A client 72 communicates with a server 74 by sending a command 76, and the server 74 responds with a reply 78, which may be reply message 58 or a data message 60 (FIG. 5). The server 74 may have the resources 80 to perform the task client 72 demanded, or it may act as a client to another server 82, which receives the command 86 and responds accordingly with a reply 88 and appropriate actions performed by its resource 84. Additionally, the server 74 may also have an interface to an entity or subsystem which does not employ the message protocol used by the servers.

Having described the server shell basic functions, it is instructive to discuss certain servers that are built upon the server shell. For example, the queue server 34 is a server 40 that is crucial to the operations of the automation development system. To provide transparency in communications among all the client and server processes in the system 10, the queue server 34 manages a table of named message queues, and oversees communications within the integrated automation development system 10. The queue server 34 provides client and server processes a low-level message interface that enables the processes to carry on higher-level communications.

The primary function of the queue server is to associate ASCII names, for example time server 36 and SMS server 16, with queue identification numbers or keys assigned by the operating system, such as UNIX or similar operating systems. This allows servers in the system to refer to each other by well-known names instead of queue identification numbers. Only the queue server 34 needs to store the table of queue names and their corresponding operating system queue identification numbers.

Figure 7:
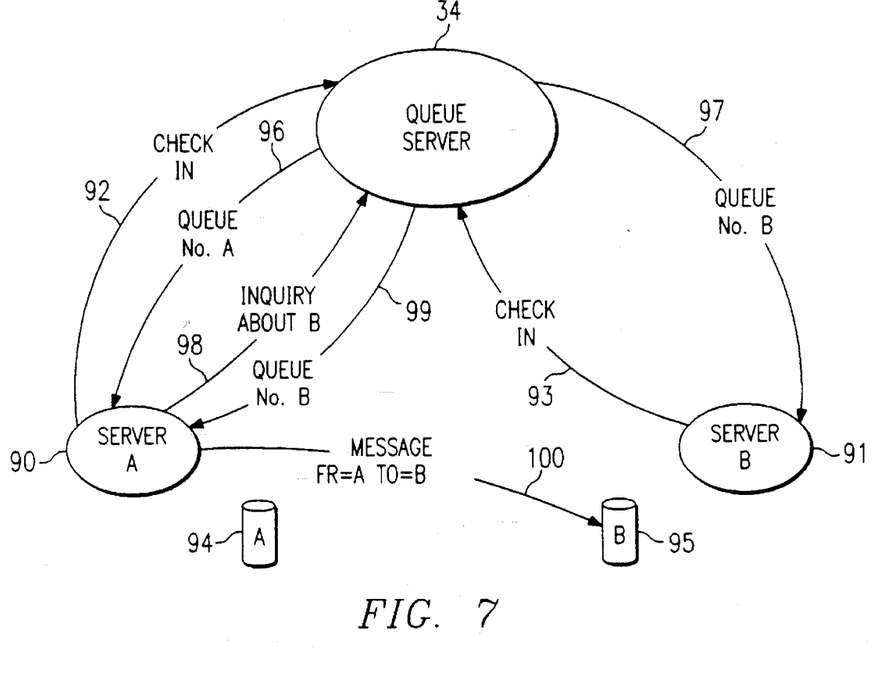
FIG. 7 is a simplified data flow diagram illustrating the message-based communications process.

Referring to FIG. 7, the messaging protocol is illustrated with a server A 90 and a server B 91. The servers A and B both check in or register with the queue server 34 upon start up, as shown by arrows 92 and 93. The queue server 34 then records the process or server names in a table and assigns a queue ID or identification number to each of the servers 90 and 91, if necessary. The queue server 34 also creates a queue 94 and 95 for each server process 90 and 91 if it does not already exists, then returns the identification number of the queues to the newly started process 90 and 91, as shown by arrows 96 and 97. The new processes A 90 and B 91 may then use their respective queue 94 and 95 to receive messages. Accordingly, the use of queues identification numbers is transparent to the system.

When server A 90 wants to send a message to server B 91, for example, it asks the queue server 34 for server B's queue ID by providing server B's queue name, as shown by arrow 98. The queue server 34 then looks up server B's name in its tables and returns the corresponding queue ID to server A 90, as shown by arrow 99. Server A 90 can then use server B's queue ID to send messages to the queue 95 of server B, as shown by arrow 100. Each server process preferably keeps the name and corresponding ID information of other server processes in a local table, so that it need not ask the queue server 34 each time a message must be sent to the other processes.

Unless a process requests the queue server 34 to delete its queue from the system 10 when the server terminates, the queue server 34 will keep the queue name and ID in its tables for future use. This allows a process to terminate temporarily while still allowing other processes to place messages on its queue. When a process is restarted and checks in with the queue server, it is assigned the existing queue ID. The process can then read any messages that accumulated on its queue while it was down, and respond to them. Therefore, it is preferable that only short-lived clients remove their queues when terminating.

Because the queue server 34 provides queue management for all servers and clients in the system 10, it must be running as a background process before any other processes are started. The queue server 34 may be started manually by entering the appropriate command on the command line, but it is preferable that the queue server 34 is started automatically whenever the CPU is started or rebooted.

Figure 8:
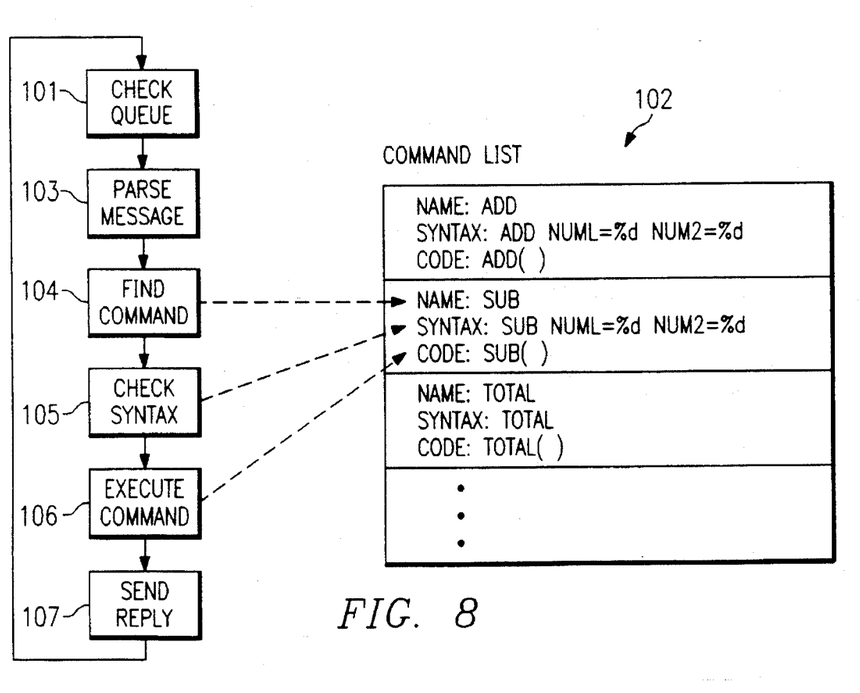
FIG. 8 is a simplified flowchart of processing command messages.

Referring to FIG. 8 in addition to FIGS. 2 and 7, the basic flow for command message processing is shown. Since virtually all actions in the system 10 are message-driven, server B 91, for example, first checks its queue 95 to detect messages arriving, as shown in block 101. The messages contain commands issued from a client or another server to invoke an action. The server shell 42 of server B 91 decodes or parses the message into fields, and locates the command specified in the message in a command list 102, as shown in blocks 103 and 104. The command list 102 represents all commands or actions that its server is capable of performing.

In addition, the command list 102 specifies the correct syntax of the command, including its parameters, and the location of the code that performs the specified command's task. Therefore, the server shell 42 verifies command syntax in the message, if necessary, as shown in block 105. As discussed above, the messages used in the integrated automation system 10 are composed in readable ASCII string with a well-defined yet flexible format. The server shell 42 then routes message to command code based on a name or special routing parameters. The command code is executed, using the message as input, as shown in block 106. After the code is executed, the server shell 42 generates a reply message if necessary, as shown in block 107. The reply message is a message returned to a client by a server as a response to the command message sent by the client.

Messages between servers 54 and clients 52 are routed by queue names. The queue server 34 (FIG. 1) manages queue name associations and is used by all other clients 52 and servers 54 to send messages to one another. Within servers 54, messages are routed by command name or message context. When a server 54 receives a command message, the action taken is based upon the command name given.

A message context or "ctxt=" is a unique identifier placed in command messages from clients 52. This message context identifier must be preserved by the servers 54, and be returned in any resulting reply or data messages. The message context in the reply and data messages allows the client 52 to identify incoming results, even if several similar commands have been sent out to more than one server 54.

As discussed above, all messages in the automation development system 10 are preferably ASCII text strings. These text strings can contain any data that can be represented in the string format. The individual items of data in a message are separated by white spaces, which include SPACES, LINEFEEDS, CARRIAGE RETURNS, and TABS. These items of data are parameters or fields and fall into two categories: tagged and non-tagged, where tagged parameters consist of a tag and the data or value, separated by an equal sign or =, and non-tagged parameters are data items that do not contain equal signs.

All automation development system 10 messages must begin with a "fr" tagged parameter. In other words, "fr=" must be the first three characters of any message. This is the only data in the messages that must have a fixed position. The "fr" tag identifies the sender of the message and also identifies the message as an automation development system message in servers that must understand other message formats.

All message routing information is included within the text of a message. The "fr=" and "to=" tagged parameters specify routing information for communication between servers 54 and clients 52, and the "do=" and "ctxt=" tagged parameters route messages to specific blocks of code within servers. In summary, the reserved tag names and their functions are listed below:

| RESERVED TAG NAMES | |
| --- | --- |
| fr | Identifies sender and standard format. |
| to | Identifies intended receiver. |
| do | Identifies command to execute. |
| ctxt | Identifies a particular Reply or Data Message. |
| reply | Identifies return code of a command. |
| command | Identifies cmd that generated a Reply or Data Message. |
| comment | Explains a return code of a command. |
| RESERVED NON-TAGGED PARAMETERS | |
| noreply | Placed in Cmd Messages to suppress the Reply Message. |
| RESERVED TAG NAMES | |
| nosyntax | Placed in Cmd Messages to suppress syntax checking. |

Referring to FIG. 6, a simplified flowchart representing the server logic for command message processing is shown. A server 54 must respond to incoming command messages from any client task 52. The server 54 has no prior knowledge of which clients 52 may send it commands. Incoming command messages include the name of the sending client task specified by the "fr=" tag. Therefore, the server must be able to reply to named tasks which are not known before runtime. This is accomplished through communication with the queue server 34 (FIG. 1), which manages named queues. Servers 54 and clients 52 must register its name with the queue server upon start-up to make themselves known to the system 10. This is shown as CHECK IN in block 122. If the check in was not successful, the server exits in block 126 and is not allowed to receive messages. If the check in was successful, execution proceeds to block 128 where it waits for incoming command messages from any clients.

As shown in block 130, when a server 54 responds to a command message by returning a reply message or a data message to a client 52, it must preserve the message context if context was given in the command message from the client. The server 54 then looks in its command list to determine it can execute the command, as shown in block 132. If the command cannot be found in the command list, then an error reply message is created, as shown in block 138. Else, the command is executed, and a reply is created, as shown in blocks 134 and 136. The command context that was preserved in block 130 is then included in the created reply message, and the message is sent, as shown in blocks 140 and 142. There are also situations where reply messages are not required. For example, if the server 54 receives a command message that contains the non-tagged parameter "noreply", it should process the command normally, but should not generate a reply message for that command message. The server 54 stays in the loop waiting for command messages, executing the commands, and returning reply messages until it exits, as shown in blocks 144 and 146. Upon exit, the server process is terminated, and the queue server 34 (FIG. 1) may optionally delete the corresponding queue from its queue tables.

FIG. 7 shows a more detailed representation of the server logic control flow. All the servers 54 perform certain actions when they are first started (block 160). These actions allow initialization of the servers 54 at start-up. This allows one executable file to be used for several different but similar applications, reducing the amount of redundant code and time spend recompiling different versions of servers. As shown in block 162, all server common commands 46 (FIG. 2), including user-specified commands, are created at start-up. Because these commands are created immediately after start-up, they can be called from the server shell command-line, or at any point in a start-up file. This is also were the command list is created.

As shown in block 164, the server shell sets software traps for pre-specified signals that are intercepted by the server shell to allow the server to make a graceful exit. A graceful exit is one in which the server executes any exit code defined by the server developer or the server shell. In addition, the servers perform a graceful exit when they receive an exit command from a client.

In block 166, the shell dynamic variables are created. Each server 54 built upon the server shell 42 contains some predefined dynamic variables. The dynamic variables are initialized before command-line arguments to the server are processed, so their values may be overridden by command-line commands or start-up files, if necessary. Preferably, the dynamic variables that are initialized are the server's name as derived from the command-line name of the process; the current working directory which contains the path of the directory from which the process was started; the start-up filename variable which can be set on the command line to tell the server shell to execute some start-up commands in a file; and the server shell version number to reflect the version of the server shell this server is built upon.

The integrated automation development system servers also contain several default logs (not shown). The names and attributes of these logs are assigned at this time, as shown in block 168. Preferably, the filename and default attributes can be reset by command-line commands, or start-up commands. Subsequently in block 170, one or more commands may be entered on the operating system command line when the server process is started and these commands are executed. If there are any errors in the command-line commands, the server exits, as shown in blocks 172 and 174.

In block 176, the server shell checks in with the queue server to enable messaging. The check in process is described above in conjunction with references to FIG. 7. Since the messages are managed and routed by server names, each server must be unique to the system 10. If the queue server is not running, or the check-in fails for any reason, an error message will be printed or displayed and the server terminates, as shown in blocks 178 and 180.

As shown in block 182, if there is a command named srv_init, it is invoked at this point. The srv_init command is a location-specific and server-specific initialization hook command. Generally, the automation development system servers 54 are created by adding to the server shell 42 user-specified commands that can be invoked by clients. The user-specified commands are processed as the result of an incoming command message, and have no effect on the server shell control logic. However, a special type of commands may be provided as a way for a server developer to add code to the server shell control logic in predefined locations in the control flow. By default, these commands perform no action, and have no effect on server execution. These special commands are executed when the server shell reaches a specific place in the flow of control. These location-specific commands, or hook commands, are indicated in the flowcharts of FIGS. 7–10 as dotted and dashed blocks.

If the dynamic variable containing the start-up filename was set on the command-line or by the srv_init command, as shown in block 184, the server shell looks in the current working directory for the start-up file named by the dynamic variable. Commands are then read from the file and executed until there are none left, as shown in blocks 186 and 188.

All file access within a server is done in relation to the current working directory of the server. The current working directory defaults to the directory from which the server was started. However, the current working directory can be set to a different directory by setting the CWD dynamic variable with a command-line command, a srv_init command, or a command in a start-up file. After loading the start-up file, if necessary, the server shell changes its actual current working directory to match the one specified by the CWD dynamic variable, as shown in block 190. If the server shell cannot change to the specified directory, the server will terminate and log an error message, as shown in blocks 192 and 194.

Figures 9, 10:
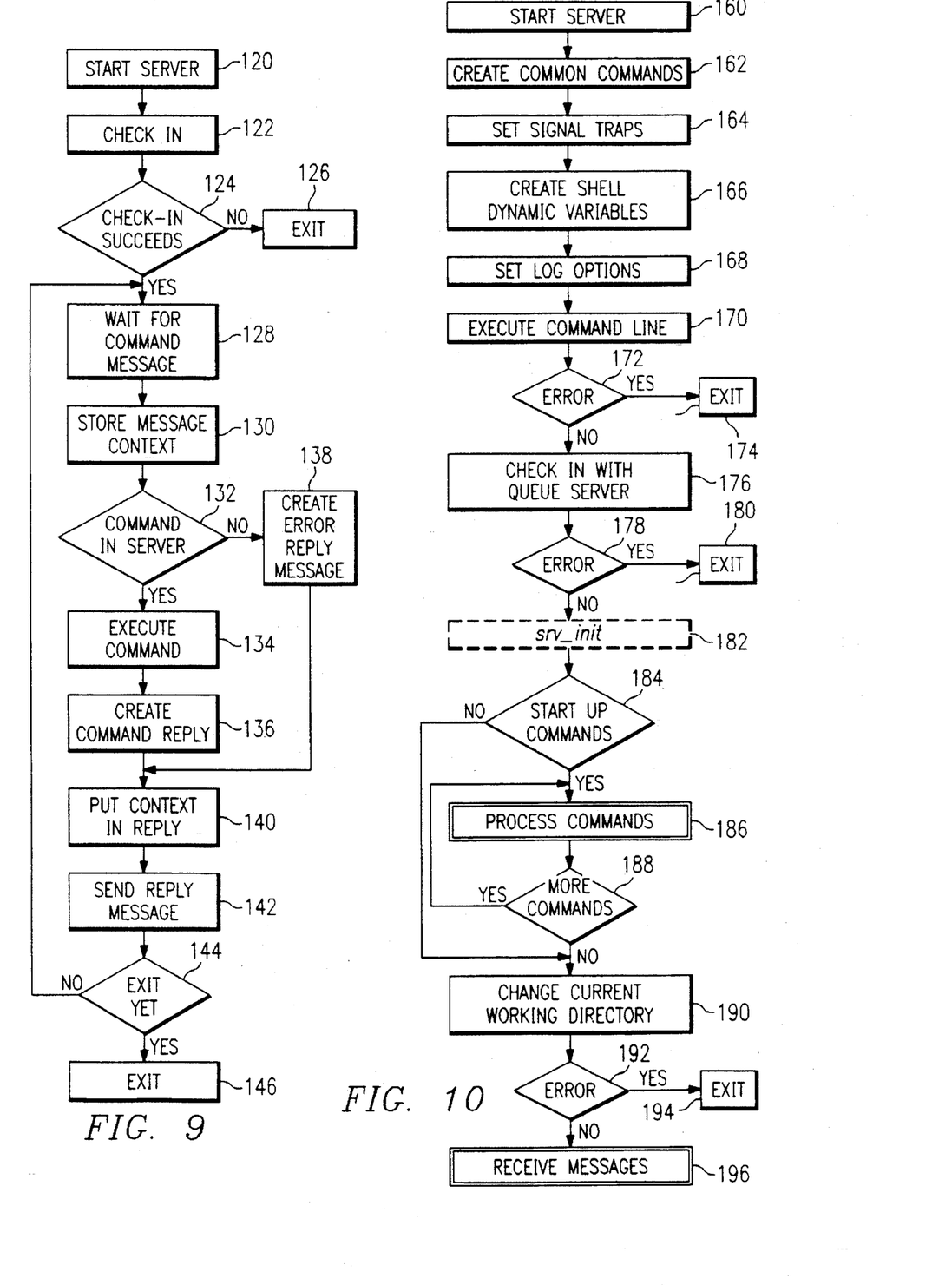
FIG. 9 is simplified flowchart of a basic server control flow.
FIG. 10 is a simplified flowchart of server initialization.

Once the server completes its initialization process, it enters a loop in which it reads a message from the queue, processes it, then returns to read another message, as shown in block 196. FIGS. 8–10 shows the control logic for the message processing loop.

Figure 11:
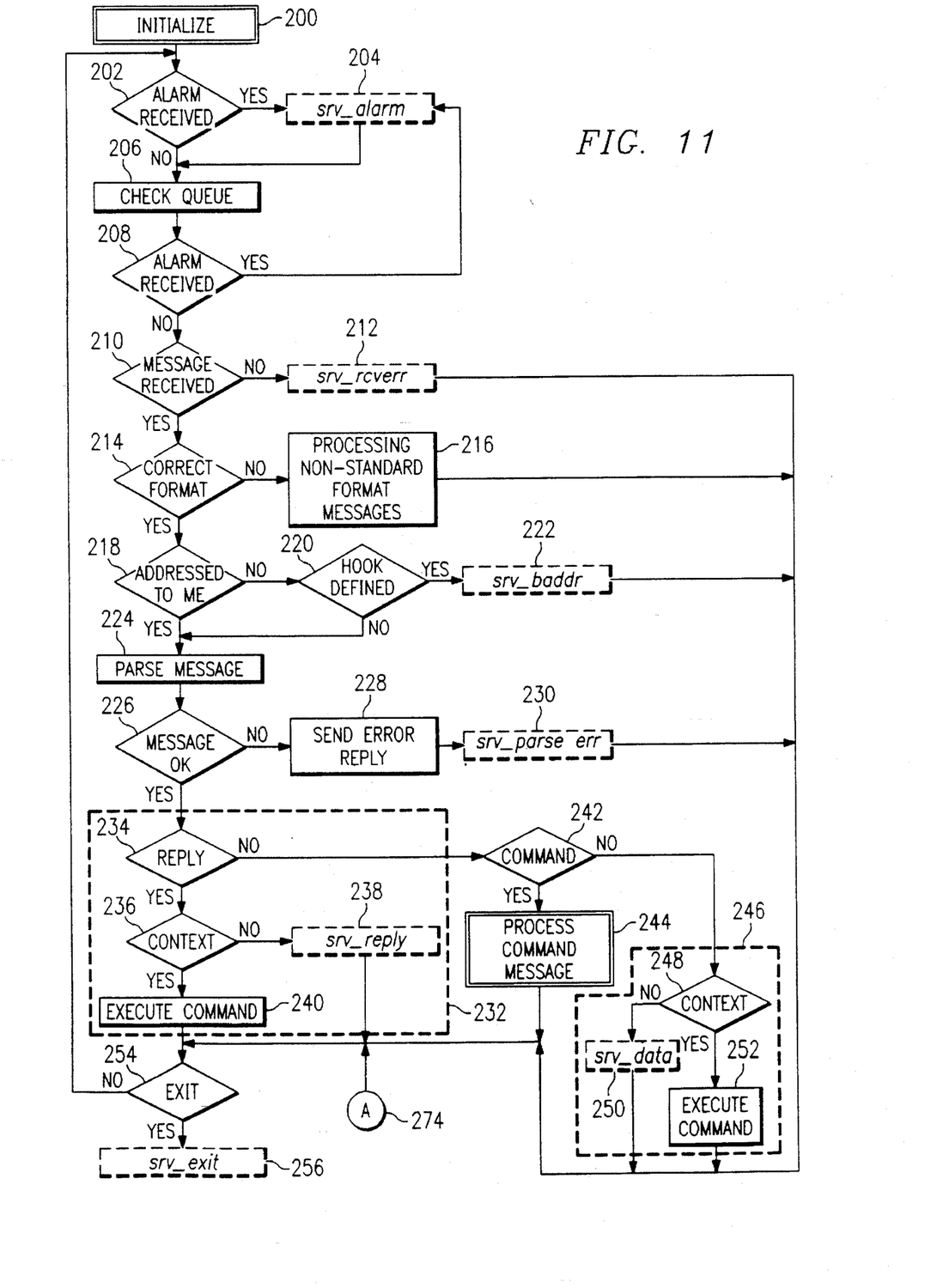
FIG. 11 is a simplified flowchart of server message processing.

In FIG. 11, block 200 represents the initialization process that is shown in FIG. 7. If an alarm signal generated by a command is received while the server shell is waiting for a message, the hook command srv_alarm is invoked, as shown in blocks 202 and 204. Server Shell then continues waiting for a message by checking the queue, as shown in block 206. If an alarm signal is received at this time, it returns to block 204 where the srv_alarm hook command is invoked. Otherwise, if there are no messages in the queue, as shown in block 210, the srv_rcverr hook command is invoked, as shown in block 212. By default, the server shell waits indefinitely for a message to arrive on the queue. When a message arrives, flow continues and the message is processed if possible.

However, if a dynamic variable is defined which specifies that the server should not wait forever for messages, the server checks the message queue once, and processes the received message if one was waiting. If not, the server shell tries to invoke the srv_rcverr hook command. This procedure is used to allow for servers that block on devices in addition to the message queue, such as the terminal server 28 (FIG. 1). If this dynamic variable is not defined and an error occurs while trying to read a message from the queue, the server shell invokes srv_rcverr, if it exists, logs a message to the error log, and returns to wait for another message if it is not told to exit. Preferably, provisions may be made so that if a specified number of errors occur consecutively, the server shell is to write a message to the error log and terminate.

Subsequently, if a message is received as shown in block 210, the message is checked to determine whether it is in the correct automation development system format. The correct message format is preferably defined as a message which begins with the tag "fr". If the incoming message is determined to be a non-automation development system message in block 214, it is treated and processed as a non-standard format message in block 216, which continues in FIG. 12 and is discussed below. If the message is of the correct format, the server shell looks for a "to" tag in the message, as shown in block 218. If the "to" tag exists in the message, but the value of the "to" parameter does not match the name of this receiving server, then the server shell invokes the hook command srv_baddr, if it is defined, as shown in blocks 220 and 222. If the "to" tag value is the same as the server name, or there is no srv_baddr hook defined, then the message is processed normally. The srv_baddr hook command is used by the queue server 34 (FIG. 1) to route messages to other CPU's.

To process the message, it is parsed into tagged and non-tagged parameters, as shown in block 224. Parsing allows commands written in the C++ language and Script language to access the message parameters. If an error occurs while parsing the message, due to mismatched quotes, a reply message indicating the error is returned to the client, as shown in blocks 226 and 228. The server shell then invokes the hook command srv_parseerr, if it is defined, as shown in block 230.

If the message parsing was completed without an error, and a "reply" tag is found in the incoming message, it is treated as a reply message, as shown in block 234. If the message also contains a "ctxt" parameter, the server shell then looks in a waiting list for an entry with a matching context value. If an entry is found, the command associated with the entry is invoked, as shown in block 240. If there is not a "ctxt" parameter in the message, or the "ctxt" in the message does not exist in the waiting list, the server shell invokes the hook command srv_reply, if it exists as shown in block 238. If it does not exist, the message is discarded without execution of the command in the message.

A command message is defined as a message that contains a "do" tag but no "reply" tag. Therefore, if no "reply" tag is found in block 234, then the server shell looks for the "do" tag and parameter, as shown in block 242. If the "do" tag and parameter exist, then it is a command message, and the processing is shown in block 244 and in FIG. 13. Command message processing is described in detail below in conjunction with FIG. 13.

If a message does not contain a "do" or a "reply" tag, it is assumed to be a data message. The processing of data messages are shown in block 246. The server shell looks for a "ctxt" parameter in the message, and checks the waiting list for an entry with the same context parameter, as shown in block 248. If the message does not have a "ctxt" tag, or it contains a "ctxt" tag that does not exist in the waiting list, then the server shell invokes a hook command srv_data, if it exists, as shown in block 250. If the srv_data command does not exist, the message is discarded and ignored. If an entry with a matching context value is found, the command associated with the entry is executed, as shown in block 252.

The server shell continues processing messages until it is terminated with an exit signal or an "exit" command from a client. The exit command preferably sets an exit flag within the server shell. The exit flag is checked at the end of each message processing loop, as shown in block 254. If it has been set, the server shell invokes a srv_exit hook command, if it exists, then terminates, as shown in block 256.

Figure 12:
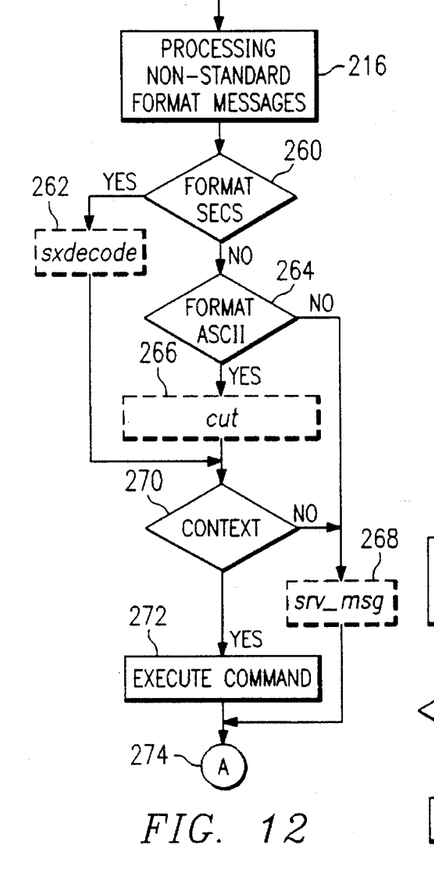
FIG. 12 is a simplified flowchart of server non-standard message processing.

Referring to FIG. 12, the processing of non-standard format messages 216 is shown. When a non-standard format message is received, the server shell preferably checks a specific dynamic variable, for example SYS>PROTOCOL (shown in FIG. 4), to decide how to process the message. The SYS>PROTOCOL dynamic variable may indicate that the message is in, for example, the SECS (SEMI Equipment Communications Standard) format or the ASCII format, as shown in blocks 260 and 264. If this variable doesn't exist or had no value, the message is passed to a hook command srv_msg, if it exists, as shown in block 268. If srv_msg does not exist, the message is discarded and ignored.

If the SYS>PROTOCOL dynamic variable is set to SECS, then the server shell processes the message by invoking a hook command sxdecode. The sxdecode hook command extracts data from the SECS message and stores them in dynamic variables. If the SYS>PROTOCOL dynamic variable has been set to ASCII, the server shell executes the cut hook command to process the message. The cut command extracts data from ASCII messages and stores the extracted data in dynamic variables. In both instances, the format of the SECS and ASCII messages must have been previously defined. Both commands are also defined in the equipment server shell for SECS and ASCII message processing.

After a non-standard format message has been decoded by sxdecode or cut, the server shell checks the waiting list for an entry that directs the message to a command for processing, as shown in block 270. If an entry is found, the corresponding command is invoked, as shown in block 272. If no context entry is found and srv_msg is defined, srv_msg invoked to process the message, as shown in block 268. Execution then returns to block 254 in FIG. 11.

Figure 13:
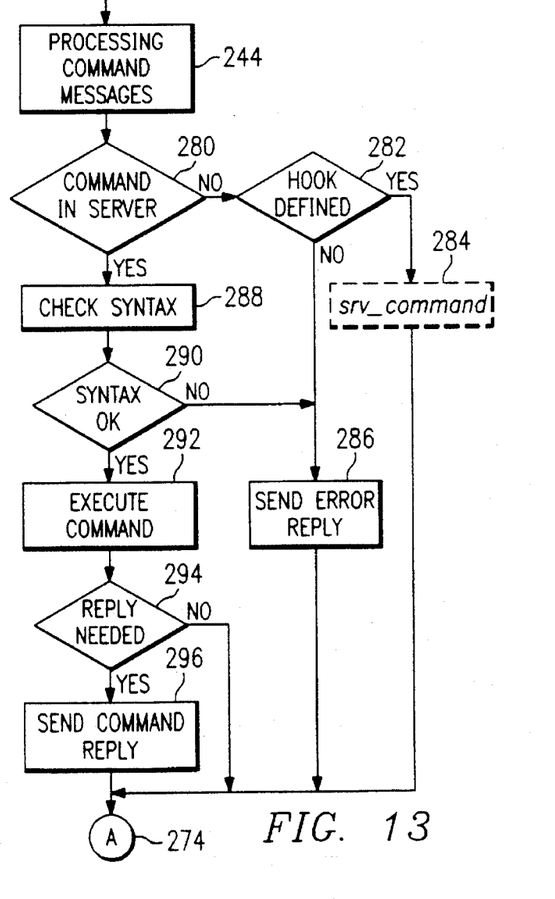
FIG. 13 is a simplified flowchart of server command message processing.

If a standard format message contains a "do" tag, but no "reply" tag, it is assumed to be a command message. Referring to FIG. 13, the command message processing 244 is shown. The server shell preferably assumes that the "do" tag identifies the command to be executed. It looks through the server's command list for a command whose name matches the value of the "do" tag, as shown in block 280. If the command is not found in the server's command list, the server shell will execute a hook command srv_command, if it exists, as shown in blocks 282 and 284. If srv_command does not exist, the server shell will build an error reply message and send it to the client, as shown in block 286.

If the command identified by the "do" tag is found in the command list, the syntax of the command message is checked against the syntax string stored in the command list, as shown in block 288. However, if a non-tagged parameter "nosyntax" exists in the incoming message, or a dynamic variable nosyntax exists, then syntax checking is not performed. If a syntax error is detected, an error reply message will be returned to the client by the server shell and the command is not executed, as shown in blocks 290 and 286. If the command message syntax is correct, the server shell invokes the code of the command, as shown in block 292. The command code can be written in the C++ or Script language. When C++ commands are invoked, the precompiled C++ function attached to the command is called. When a Script language command is invoked, the Script language code is interpreted line-by-line.

Whether written in C++ or script, command code must return an integer value and optional string data. The returned integer and the string data are used to construct a reply message that is returned to the client. If the command message that invoked the command includes a "noreply" parameter, then a reply is not needed and is not sent to the client, as shown in block 294. The "noreply" parameter is used when a particular command's successful completion is not crucial to the client. If a reply is needed and the command message that invoked the command includes a "ctxt" parameter, the server shell includes the context tag and its value in the resulting reply message. Execution then returns to block 254 in FIG. 11.

Provisions are also provided in the automation development system 10 for communication with entities that were not created by the automation development system 10. Since the queue server does not have control over these queues, it must be told what names to assign to these queues. The queue server thus maintains a fixed key table or file that records the names of predefined queues and their corresponding keys or IDs and an automatic queue table that records the queue names and keys of servers that have checked in. Once a queue key has been registered in one of the key tables, it can be referenced by name just like any other queue in the system.

The queue server further supports message sending and receiving between clients and servers on separate CPUs. Each CPU may be running a separate automation development system, each with a queue server and an additional process called a net server. The queue server is used to send messages to the other CPUs through a network, while the net server is used to receive messages from the network and deliver them to the destination processes.

Figure 14:
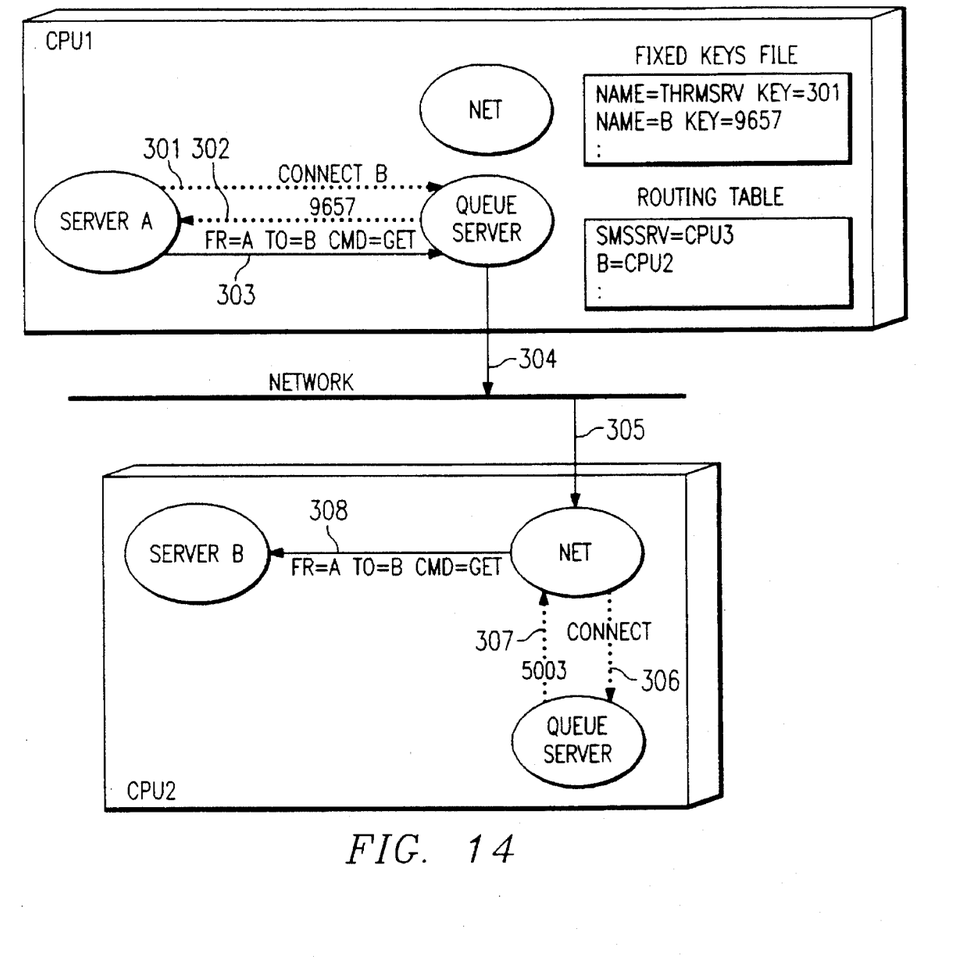
FIG. 14 is a simplified data flow diagram of distributed message communication.

FIG. 14 illustrates the process by which distributed messages are delivered. A server A running on CPU1 wishes to send a message to a server B running on CPU2:

1. Server A asks the queue server for server B's queue ID, as shown by arrow 301.
2. Since the queue server does not find server B in the list of automatic queues, it looks for it in the fixed keys file.
3. The queue server finds server B in the fixed keys file and sends the key having the queue server's queue value, for example 9657, to server A, as shown by arrow 302.
4. Server A sends a message to queue 9657, as shown by arrow 303.
5. The queue server on CPU1 receives the message from server A, but notices that the "to" tag does not match its queue value.
6. The queue server looks in a routing table for server B. The routing table is preferably a dynamic variable structure that contains names of processes and the remote machine on which they exit.
7. The queue server finds server B and the name of server B's CPU in the routing table and sends the message from server A across the network to CPU2, as shown by arrow 304.
8. The net process on CPU2 receives the message from the network, as shown by arrow 305.
9. The net process registers server A with CPU2's queue server, as shown by arrow 306.
10. The net process asks CPU2's queue server for server B's queue ID. The queue server returns the queue ID, for example 5003, that server B was assigned when it checked in, as shown by arrow 307.

11. The net process sends the message to server B, as shown by arrow 308.

12. Server B receives the message, just as if it were sent from a local process.

Besides the queue server 34, the integrated automation development system 10 may also need a time server 36 (FIG. 1) to coordinate time-specific or time-dependent activities for servers and clients. For example, Timer may be used to send a maintenance command message every 24 hours or it may be used to send a "timeout" message in 30 seconds. The time server is a server's link to a clock or timekeeping device. The time server also must be run in the background like the queue server.

The equipment server 22 (FIG. 1) provides methods or server commands for defining a server interface to a specific type of manufacturing equipment. The equipment server includes all of the code or commands of the server shell, plus additional commands that provide the functionality required to interface with the manufacturing equipment. In addition to the equipment server commands that allow definition and use of an equipment server, the equipment server also defines two special commands named sxdecode and cut described above that process SECS and ASCII messages received from the manufacturing equipment. The equipment server further preferably provides logging of data from the equipment.

Each piece of equipment served by an equipment server must be assigned a unique SECS identification number or ID. SECS equipment requires that this ID be placed in all messages to and from equipment, so the equipment server uses it to separate and identify incoming SECS messages. The equipment server includes several commands for routing, decoding, encoding, and sending SECS messages. Please refer to relevant SECS documentation for a detailed discussion of the SECS message formats.

The graphical control client 14 of FIG. 1 may be implemented as an automation control server that employs the Sequential Function Chart or SFC notation. The SFC notation is derived from an international standard for graphical representation of control systems, as defined by the International Electrotechnical Commission. The graphical control client 14 then provides and defines the control flow of the automation development system. It provides commands for defining and debugging a control application. The control application definition is then used to coordinate the servers and clients in the system to perform the application.

Other server processes may also be implemented in the integrated automation development system 10 to perform interface functions with other entities, such as databases. Servers may be implemented to facilitate integration, such as a debug server that monitors certain actions and functions to detect miscoding in the system, a talk server that provides developers with a command-line interface to all other servers in the system, and a SFC editor that provides SFC editing capabilities. As discussed above, all such servers are implemented by adding application-specific commands to the basic code and commands of the server shell 42 (FIG. 2), so that the underlying control flow logic, messaging management, command management, script interpretation, and dynamic variable management are already in place. Therefore, automation integration is made easier, and implementation and modifications may be done more quickly.

Although the present invention has been described in detail, it should be understood that various changes, substitutions and alterations can be made thereto without departing from the spirit and scope of the present invention as defined by the appended claims.

What is claimed is:

1. An integrated automation development system for controlling and coordinating manufacturing equipment, said system comprising a plurality of server processes, each of said server processes comprising:

a messaging manager for receiving ASCII messages form said plurality of server processes;

an interpreter for evaluating said received ASCII messages for a variable number of said server processes including commands expressed in a text-based programming language, said interpreter recognizing said commands in said ASCII messages;

a command manager for receiving and executing said commands; and a logic controller for managing the logic flow of said command execution by said command manager.

2. The integrated automation development system, as set forth in claim 1, wherein said interpreter recognizes dynamic variables in said received ASCII messages, said dynamic variables being structured hierarchically and used to store data values during command execution by said command manager or supplying values needed by said command manager for command execution.

3. The integrated automation development system, as set forth in claim 1, wherein said logic controller directs said command manager to check for incoming messages, parse said messages, find the commands in said messages, check the syntax of the commands, execute the commands, generate a reply message and said logic controller further directs said messaging manager to send said reply message.

4. The integrated automation development system, as set forth in claim 1, wherein each of said server processes further comprises a message queue for receiving messages, and wherein said logic controller directs said command manager to check said message queue for incoming messages, parse said messages, identify the format of said messages, process said messages in response to said identified format of said messages, and continue checking said message queue for messages.

5. The integrated automation development system, as set forth in claim 1, wherein said command manager is an application-specific command manager to execute application-specific commands for controlling and interfacing with said manufacturing equipment, and wherein said logic controller directs said application-specific command manager to check for incoming messages, parse said messages, identify the format of said messages as being SECS messages, process said SECS messages, and continue checking for messages.

6. The integrated automation development system, as set forth in claim 1, wherein said command manager is an application-specific command manager to execute application-specific commands for managing message routing between said server processes.

7. The integrated automation development system, as set forth in claim 6, wherein said application-specific command manager maintains a list of existing server process names and corresponding message queue addresses.

8. The integrated automation development system, as set forth in claim 1, wherein said application-specific command manager executes application-specific commands for interfacing with a user terminal.

9. The integrated automation development system, as set forth in claim 1, wherein said application-specific command manager executes application-specific commands for interfacing with a host manufacturing computer system.

10. An integrated automation development system for controlling and coordinating manufacturing equipment, comprising:

a control client for generating messages;

a plurality of equipment servers coupled to said manufacturing equipment for receiving said messages from said control client, controlling said manufacturing equipment as directed by said messages, and generating response messages in response thereto;

a terminal server coupled to a developer interface terminal for receiving developer input and displaying system status, said terminal server generating and receiving messages; and a queue server for enabling the routing of said messages between said control client, equipment server, and terminal server;

wherein each of said control client, said equipment server, said terminal server and said queue server comprises:

a messaging manager for receiving ASCII messages from said plurality of equipment servers;

an interpreter for evaluating said received ASCII messages for a variable number of said equipment servers having commands expressed in a text-based programming language, said interpreter recognizing said commands in said ASCII messages;

a command manager for receiving and executing said commands; and a logic controller for managing the logic flow of said command execution by said command manager.

11. The system, as set forth in claim 10, wherein said interpreter recognizes dynamic variables in said received ASCII messages, said dynamic variables being structured hierarchically and used to store data values during command execution by said command manager or supplying values needed by said command manager for command execution.

12. The system, as set forth in claim 10, wherein said logic controller directs said command manager to check for incoming messages, parse said messages, find the commands in said messages, check the syntax of the commands, execute the commands, generate a reply message and wherein said logic controller further directs said messaging manager to send said reply message.

13. The system, as set forth in claim 10, wherein each of said control client, said equipment server, said terminal server and said queue server further comprising a message queue for receiving messages, and wherein said logic controller directs said command manager to check said message queue for incoming messages, parse said messages, identify the format of said messages, process said messages in response to said identified format of said messages, and continue checking said message queue for messages.

14. A method for integrating an automation development system for controlling and coordinating manufacturing equipment, said system comprising a plurality of server processes, the method comprising the steps of:

checking for and receiving ASCII messages from other server processes;

evaluating said received ASCII messages for a variable number of said server processes including at least one command expressed in a text-based programming language, and recognizing said commands in said ASCII messages;

executing said commands; and continuing to check for additional ASCII messages.

15. The method, as set forth in claim 14, further comprising the steps of recognizing dynamic variables in said ASCII messages, structuring said dynamic variables hierarchically, and using said dynamic variables to store data values during command execution or to supply values needed for command execution.

16. The method, as set forth in claim 14, further comprising the steps of parsing said ASCII messages, finding the commands in said ASCII messages, checking the syntax of the commands, executing the commands, generating a reply message, and directing said reply message to a proper destination.

17. The method, as set forth in claim 14, further comprising the steps of checking a message queue for incoming messages, parsing said messages, identifying the format of said messages, processing said messages in response to said identified message format, and continuing to check said message queue for messages.

18. The method, as set forth in claim 14, further comprising the steps of executing application-specific commands for controlling and interfacing with said manufacturing equipment, checking for incoming messages, parsing said messages, identifying the format of said messages as being SECS messages, processing said SECS messages, and continuing to check for messages.

19. The method, as set forth in claim 14, further comprising the steps of executing application-specific commands for managing message routing between said server processes, and maintaining a list of existing server process names and corresponding message queue addresses.

* * * * *